(12) United States Patent
Lucas et al.

(10) Patent No.: US 10,472,043 B2
(45) Date of Patent: Nov. 12, 2019

(54) OVER-FRAME BLANKET ASSEMBLIES AND METHODS OF INSTALLATION IN FUSELAGE ASSEMBLIES

(71) Applicant: Gulfstream Aerospace Corporation, Savannah, GA (US)

(72) Inventors: Mike Lucas, Savannah, GA (US); Kristopher Philip Lynch, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 16/042,707

(22) Filed: Jul. 23, 2018

(65) Prior Publication Data

US 2018/0346092 A1 Dec. 6, 2018

Related U.S. Application Data

(63) Continuation of application No. 14/290,018, filed on May 29, 2014, now Pat. No. 10,059,427.

(60) Provisional application No. 61/970,224, filed on Mar. 25, 2014.

(51) Int. Cl.
*B64C 1/40* (2006.01)
*B64F 5/10* (2017.01)
*B64C 1/06* (2006.01)

(52) U.S. Cl.
CPC ............... *B64C 1/40* (2013.01); *B64C 1/066* (2013.01); *B64F 5/10* (2017.01); *Y10T 29/49622* (2015.01)

(58) Field of Classification Search
CPC . B64F 5/10; B64F 5/0009; B64C 1/40; B64C 1/066; B64C 1/061; Y10T 29/49622
See application file for complete search history.

(56) References Cited

U.S. PATENT DOCUMENTS

| | | | | |
|---|---|---|---|---|
| 4,778,320 A * | 10/1988 | Nakama | .................. | F16B 5/065 24/297 |
| 5,435,679 A * | 7/1995 | Barry | .................... | A41H 37/005 244/131 |
| 6,358,591 B1 * | 3/2002 | Smith | ....................... | B64C 1/40 428/121 |
| 6,594,870 B1 * | 7/2003 | Lambrecht | .......... | F16B 35/0628 24/297 |
| 7,017,239 B2 * | 3/2006 | Kurily | ................. | B60R 13/0206 24/297 |

(Continued)

*Primary Examiner* — Valentina Xavier
(74) *Attorney, Agent, or Firm* — LKGlobal | Lorenz & Kopf, LLP (57) ABSTRACT

Fuselage assemblies, over-frame blanket assemblies, and methods of installing over-frame blanket assemblies are provided. A fuselage assembly for an aircraft includes a fuselage skin, a cabin liner, and an over-frame blanket assembly. The cabin liner has an outer side facing the fuselage skin. The over-frame blanket assembly is disposed between the fuselage skin and the cabin liner and has a first blanket piece. The first blanket piece includes a first sound barrier layer that defines a first outer surface of the over-frame blanket assembly and a first sound absorbing layer that defines a second outer surface of the over-frame blanket assembly facing the fuselage skin. A method of installing the over-frame blanket assembly includes positioning the first blanket piece in an orientation such that the first sound barrier layer is directly adjacent the cabin liner.

12 Claims, 7 Drawing Sheets

(56) References Cited

U.S. PATENT DOCUMENTS

| | | | | |
|---|---|---|---|---|
| 7,198,315 | B2* | 4/2007 | Cass | B29C 45/1635 24/297 |
| 7,429,015 | B2* | 9/2008 | Drost | B64C 1/40 244/1 N |
| 7,549,199 | B2* | 6/2009 | Bugner | F16B 5/0628 24/289 |
| 8,011,619 | B2* | 9/2011 | Mueller | A62C 2/06 244/121 |
| 8,413,762 | B1* | 4/2013 | Wang | B64C 1/40 181/292 |
| 8,590,670 | B1* | 11/2013 | Grube | E04F 15/203 181/286 |
| 8,607,928 | B2* | 12/2013 | Richardson, III | B64C 1/40 181/294 |
| 9,079,341 | B2* | 7/2015 | Risdale | B29C 45/1635 |
| 9,132,910 | B2* | 9/2015 | Lucas | B64C 1/403 |
| 2007/0155265 | A1* | 7/2007 | Anderson | B32B 27/12 442/35 |
| 2010/0038487 | A1* | 2/2010 | Kolax | B64C 1/068 244/119 |
| 2010/0148001 | A1* | 6/2010 | Hoetzeldt | B32B 3/08 244/1 N |
| 2011/0186380 | A1* | 8/2011 | Beauvilain | B60R 13/08 181/292 |
| 2012/0256048 | A1* | 10/2012 | Wang | B64C 1/406 244/1 N |
| 2012/0276368 | A1* | 11/2012 | Fernando | B32B 5/245 428/319.1 |
| 2013/0175395 | A1* | 7/2013 | Lucas | B64C 1/403 244/131 |
| 2013/0327589 | A1* | 12/2013 | Smith | G10K 11/002 181/290 |
| 2014/0262603 | A1* | 9/2014 | Johnson | E04B 1/86 181/211 |
| 2016/0047119 | A1* | 2/2016 | Dollhopf | E04B 1/84 181/290 |
| 2016/0201318 | A1* | 7/2016 | Israel | E04B 1/8209 181/290 |
| 2017/0001708 | A1* | 1/2017 | Alonso-Miralles | B64C 1/40 |

\* cited by examiner

OVER-FRAME BLANKET ASSEMBLIES AND METHODS OF INSTALLATION IN FUSELAGE ASSEMBLIES

CROSS-REFERENCE TO RELATED APPLICATIONS

This application is a Continuation of U.S. application Ser. No. 14/290,018, filed May 29, 2014 which claims the benefit of U.S. Provisional Application No. 61/970,224, filed Mar. 25, 2014, all of which are incorporated herein in their entirety by reference.

TECHNICAL FIELD

The technical field relates generally to fuselage assemblies for aircraft and more particularly relates to fuselage assemblies with over-frame blanket assemblies and methods of installing over-frame blankets.

BACKGROUND

A conventional passenger aircraft includes a fuselage, a cabin interior attached to and/or supported by the fuselage, and thermal/acoustic insulation bags or pieces in the fuselage frame bays between the fuselage frames. For further cabin noise reduction, an additional sound-deadening blanket can be added between the fuselage structure and the cabin liner. As the aircraft is flown, the fuselage interacts with the atmosphere. This interaction generates vibration which, if left unchecked, will be perceived by occupants of the aircraft as noise, which is undesirable. The sound-deadening blanket is used to suppress the transmission of noise into the cabin. The sound-deadening blanket is positioned to intercept the noise vibrations and is configured to suppress the vibrations transmitted from the fuselage towards the cabin.

Conventional sound-deadening blankets have three layers through the depth of the blanket. The three layers include a center layer of a sound barrier material surrounded by two layers of sound absorbing material. The sound absorbing layers absorb sound compression waves that bounce between the sound barrier layer and the fuselage and between the sound barrier layer and the cabin interior.

During the lifespan of the aircraft, it is often desirable to access electronic components, electrical wires, oxygen lines, or the like that are located between the fuselage and the sound-deadening blanket. Such access is often accomplished by cutting through the sound-deadening blanket. Such cuts are typically taped back together with a tape applied to the inner layer of the sound-deadening blanket. Taping the inner layer typically results in increased sound transmission as contrasted with the uncut sound-deadening blanket. Although these sound-deadening blankets are adequate for their intended purpose, the need for improved sound deadening in the cabin of the aircraft is essentially constant.

As such, it is desirable to provide sound deadening assemblies and methods that provide improved ease of assembly and ease of repair. In addition, other desirable features and characteristics will become apparent from the subsequent summary and detailed description, and the appended claims, taken in conjunction with the accompanying drawings and this background.

SUMMARY OF EMBODIMENTS

Various non-limiting embodiments of fuselage assemblies, over-frame blanket assemblies, and methods for installing over-frame blankets are disclosed herein.

In a first non-limiting embodiment, a fuselage assembly for an aircraft includes, but is not limited to, a fuselage skin, a cabin liner, and an over-frame blanket assembly. The cabin liner has an outer side facing the fuselage skin. The over-frame blanket assembly is disposed between the fuselage skin and the cabin liner and has a first blanket piece. The first blanket piece includes a first sound barrier layer that defines a first outer surface of the over-frame blanket assembly and a first sound absorbing layer that defines a second outer surface of the over-frame blanket assembly facing the fuselage skin.

In a second non-limiting embodiment, an over-frame blanket assembly includes, but is not limited to, a first sound barrier layer and a first sound absorbing layer. The first sound barrier layer defines a first outer surface of the over-frame blanket assembly and the first sound absorbing layer defines a second outer surface of the over-frame blanket assembly for facing a fuselage skin when installed in the fuselage assembly.

In a third non-limiting embodiment, a method for installing an over-frame blanket in a fuselage assembly of an aircraft includes, but is not limited to, providing a first blanket piece of the over-frame blanket assembly. The method further includes positioning the first blanket piece in an orientation such that a first sound barrier layer is directly adjacent to a cabin liner. The method further still includes securing the first blanket piece to the fuselage assembly in the orientation.

BRIEF DESCRIPTION OF THE DRAWINGS

Advantages of the present invention will be readily appreciated, as the same becomes better understood by reference to the following detailed description when considered in connection with the accompanying drawings wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various non-limiting embodiments of an improved over-frame blanket assembly, a fuselage assembly, and a method for installing an over-frame blanket assembly are disclosed herein. The over-frame blanket assembly has a first outer surface that is defined by a sound barrier layer. Seams, tears, apertures, and mounting assembly locations are more readily apparent from visual inspection than in over-frame blanket assemblies that include a sound absorbing layer on an inner side of the over-frame blanket. Repairs and joints between blanket pieces are also more effectively sealed when the sound barrier layer defines the first outer surface as contrasted with over-frame blankets with sound absorbing layers on the inner side of the over-frame blanket.

A greater understanding of the fuselage assembly, over-frame blanket assembly, and method of installing the over-frame blanket assembly may be obtained through a review of the illustrations accompanying this application together with a review of the detailed description that follows.

Figure 1:
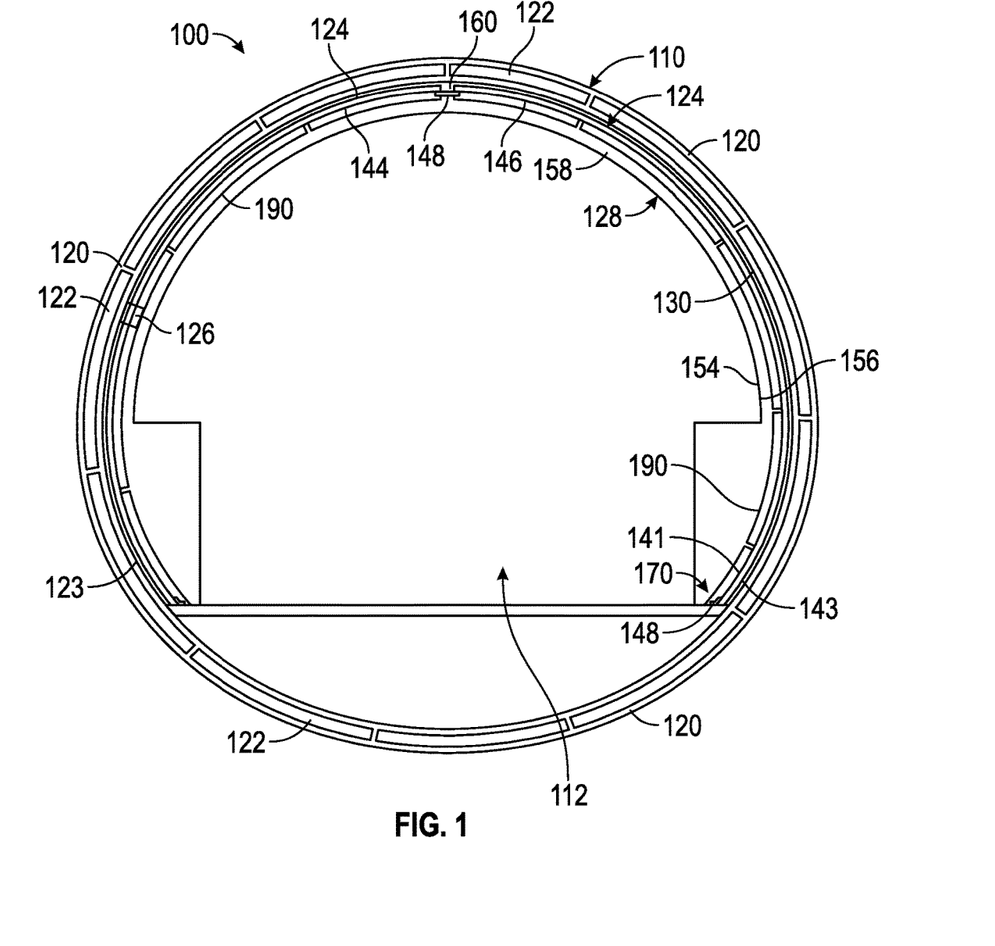
FIG. 1 is a cross sectional view illustrating a non-limiting embodiment of a fuselage assembly in accordance with the teaching of the present disclosure.

FIG. 1 is a cross sectional view illustrating an embodiment of a fuselage assembly 100 for an aircraft in accordance with the teachings of the present disclosure. Fuselage assembly 100 includes a fuselage skin 110, a fuselage frame 120, thermal/acoustic insulation pieces 122, an over-frame blanket assembly 124, a retaining assembly 126, a cabin liner 128. Fuselage skin 110 forms the periphery of the aircraft and encloses an interior cabin cavity 112. During flight, a turbulent boundary layer ("TBL") of air acts on fuselage skin 110 to create compression waves on the inside of fuselage assembly 100. If left unimpeded, TBL compression waves are transmitted to an interior cabin of the aircraft, resulting in a noisy cabin.

Fuselage frame 120 forms an inner support structure that supports an inner periphery of fuselage skin 110. Fuselage frame 120 includes frame caps 130 that project radially inwards away from fuselage skin 110. Fuselage frame 120 further defines frame bay cavities 123, in which electronics, communication cables, oxygen hoses, or other aircraft systems may be located. In some embodiments, separate cable raceways (not shown) extend through frame bay cavities 123.

Thermal/acoustic insulation pieces 122 provide sound absorption of the TBL compression waves and thermal insulation of fuselage assembly 100. Thermal/acoustic insulation pieces 122 are disposed in cavities formed by fuselage frame 120. In the example provided, thermal/acoustic insulation pieces 122 are bags filled with fiberglass insulation. It should be appreciated that other materials may be utilized without departing from the scope of the present disclosure.

Figure 2A:
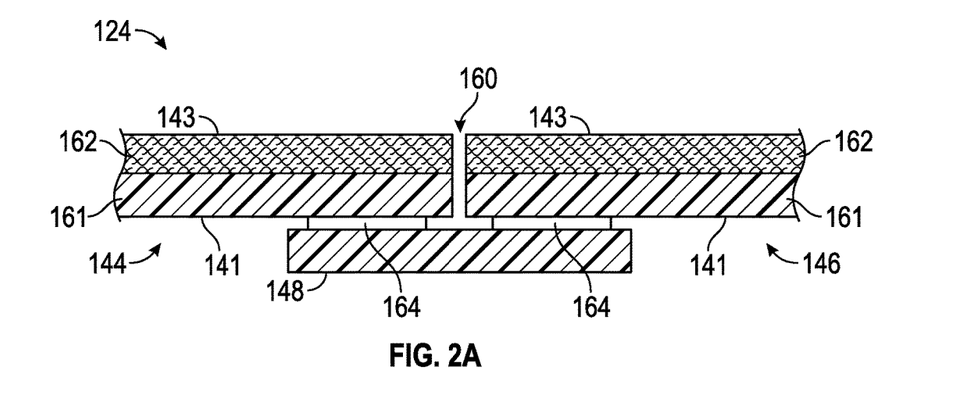
FIG. 2A is a cross-sectional view illustrating an over-frame blanket joint of the over-frame blanket assembly of FIG. 1.
Figure 2B:
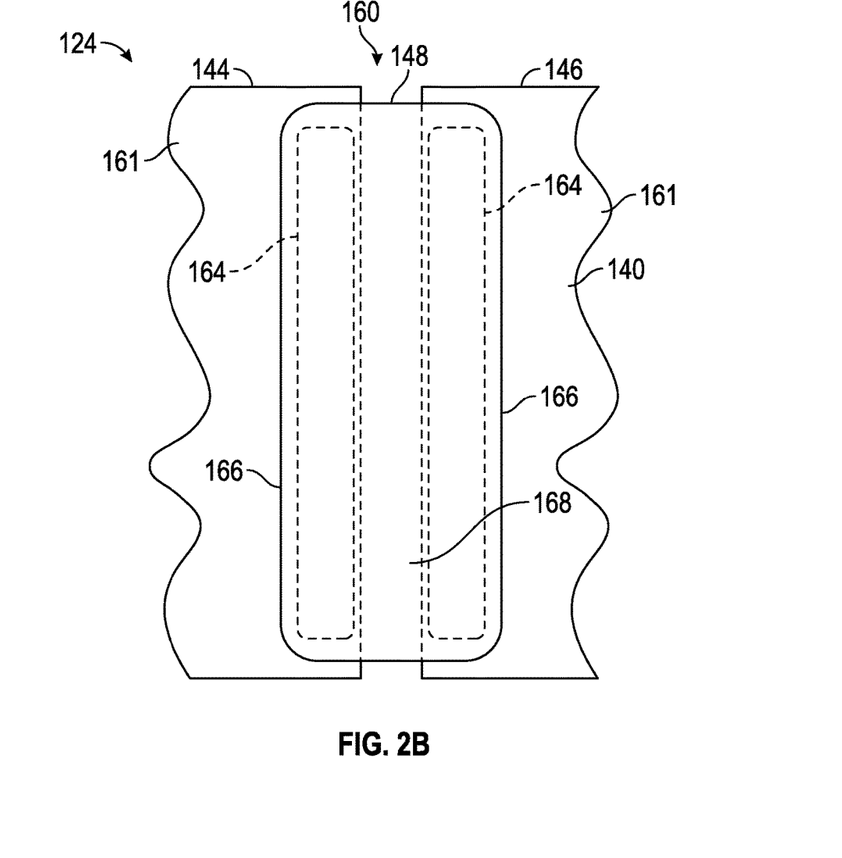
FIG. 2B. is a front view illustrating the over-frame blanket joint of FIG. 2A.

Referring now to FIGS. 2A and 2B, and with continued reference to FIG. 1, an over-frame blanket joint 160 of over-frame blanket assembly 124 is illustrated in a cross sectional view and a front view in accordance with the teachings of the present disclosure. Over-frame blanket assembly 124 includes a first outer surface 141, a second outer surface 143, a first blanket piece 144, a second blanket piece 146, and an acoustic barrier patch 148.

First blanket piece 144 and second blanket piece 146 each include a sound barrier layer 161 and a sound absorbing layer 162. In the example provided, sound barrier layer 161 and sound absorbing layer 162 define an entire depth of over-frame blanket assembly 124 at each point of over-frame blanket assembly 124 that is not part of a joint. No additional layers of sound absorbing material are included in the example provided. In some embodiments, additional layers may be utilized between sound barrier layer 161 and fuselage skin 110. In areas where blanket pieces are joined with structural components or other blanket pieces, an entire depth of over-frame blanket assembly may be defined by the respective blanket piece and acoustic barrier patch 148, as will be apparent from the description below.

Although only two blanket pieces are illustrated, it should be appreciated that as many blanket pieces as needed may be utilized to provide substantially continuous sound damping throughout fuselage assembly 100. Sound barrier layer 161 is a dense layer with enough mass to reflect a substantial portion of the TBL compression waves, as will be appreciated by those with skill in the art. In the example provided, sound barrier layer 161 is a vinyl material. It should be appreciated that other materials may be utilized without departing from the scope of the present disclosure.

Sound barrier layer 161 defines a portion of first outer surface 141 of over-frame blanket assembly 124 so that sound barrier layer 161 is exposed radially inward of over-frame blanket assembly 124 in the installed state illustrated in FIG. 1. For example, no further sound absorbing layer 162 is included in over-frame blanket assembly 124 radially inward of sound barrier layer 161. Accordingly, tears, splits, incisions, and other apertures in over-frame blanket assembly 124 are readily apparent by visual inspection.

Sound absorbing layer 162 is less dense than sound barrier layer 161 to provide sound absorption. Sound absorbing layer 162 defines second outer surface 143 of over-frame blanket assembly 124 facing fuselage skin 110. In the example provided, sound absorbing layer 162 is a felt material partially molded into sound barrier layer 161. It should be appreciated that other materials may be utilized and sound absorbing layer 162 may be secured to sound barrier layer 161 in different configurations, such as by adhesion, without departing from the scope of the present disclosure. In some embodiments, a hook fastener is secured to sound barrier 161 so that the hooks directly fasten to releasable sound absorber 190.

Acoustic barrier patch 148 is an acoustic barrier with properties similar to sound barrier layer 161. In the example provided, acoustic barrier patch 148 is a single layer of vinyl material. It should be appreciated that additional layers disposed between sound barrier layer 161 and sound absorbing layer 162, as well as different materials may be utilized without departing from the scope of the present disclosure.

Acoustic barrier patch 148 includes an adhesive layer 164 directly adhered to the acoustic barrier material. In the example provided, acoustic barrier patch 148 is a roll of acoustic barrier material with two discrete adhesive strips on lateral edge portions 166 that expose a lateral center portion 168 of acoustic barrier patch 148. It should be appreciated that adhesive layer 164 may cover an entire surface of acoustic barrier patch 148 or may be applied separately without departing from the scope of the present disclosure. In some embodiments, adhesive layer 164 may be adhered to acoustic barrier patch 148 and covered with a release liner until installation of acoustic barrier patch 148 onto first blanket piece 144 and second blanket piece 146.

Referring again to FIG. 1, cabin liner 128 is disposed radially inward of over-frame blanket assembly 124. Cabin liner 128 includes a cabin interior shell 154 and an acoustic absorber layer 156. Cabin interior shell 154 faces the interior cabin cavity 112 of the aircraft and acoustic absorber layer 156 opposes first outer surface 141 of over-frame blanket assembly 124. Cabin interior shell 154 is a layer that forms part of the decorative portions, storage portions, or other portions of the finished cabin of the aircraft. Acoustic absorber layer 156 may be felt, foam, or other acoustic absorbing materials. In the example provided, cabin liner 128 and over-frame blanket assembly 124 are separated to form a liner cavity 158 in which compression waves may reflect and be damped by acoustic absorber layer 156.

Figure 3:
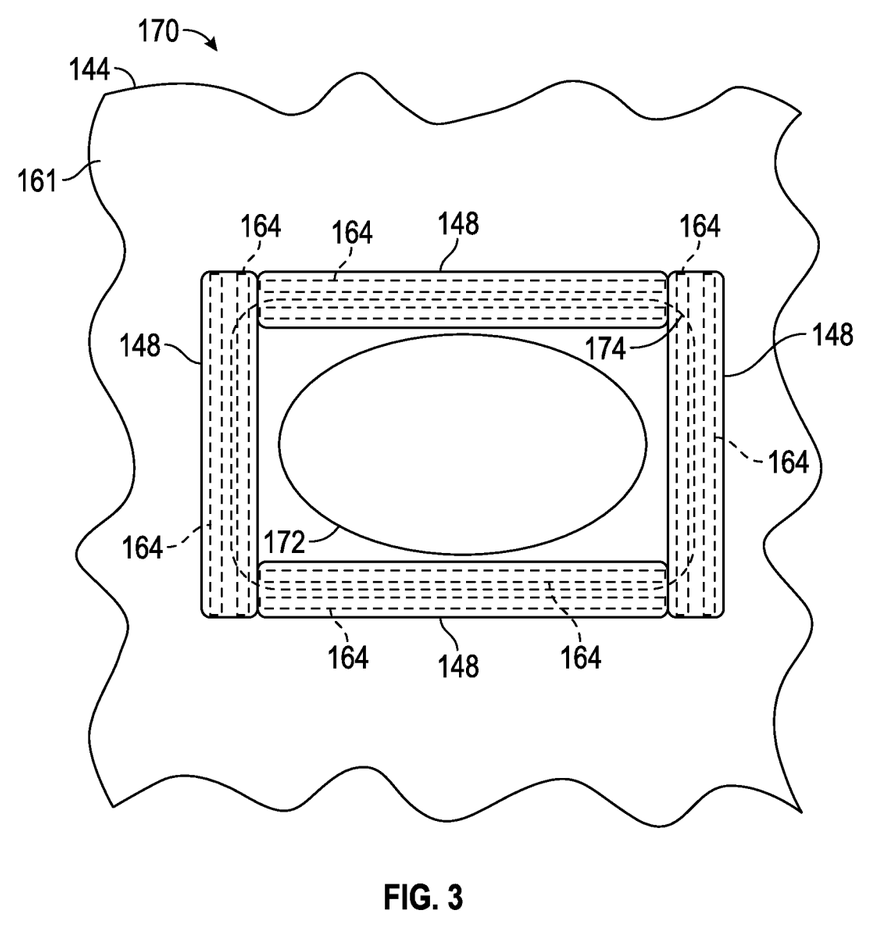
FIG. 3 is a front view illustrating an over-frame blanket joint of the over-frame blanket assembly of FIG. 1.

Referring now to FIG. 3, and with continued reference to FIG. 1, a front view of an embodiment of an over-frame blanket joint 170 is illustrated in accordance with the teachings of the present disclosure. Over-frame blanket joint 170 illustrates a joint between first blanket piece 144 and an outer portion 174 of a structural component 172 that passes through a depth of fuselage assembly 100. Structural component 172 may be any component to which over-frame blanket assembly 124 is to be attached, such as the window illustrated in FIG. 3 or a floor liner as illustrated in FIG. 1. Over-frame blanket joint 170 is similar to the joint 160 formed by acoustic barrier patch 148, first blanket piece 144, and second blanket piece 146 as illustrated in FIGS. 2A and 2B, where like numbers refer to like components. Over-frame blanket joint 170, however, adheres to first blanket piece 144 and outer portion 174 of structural component 172, as is most easily seen in FIG. 3.

Figure 4:
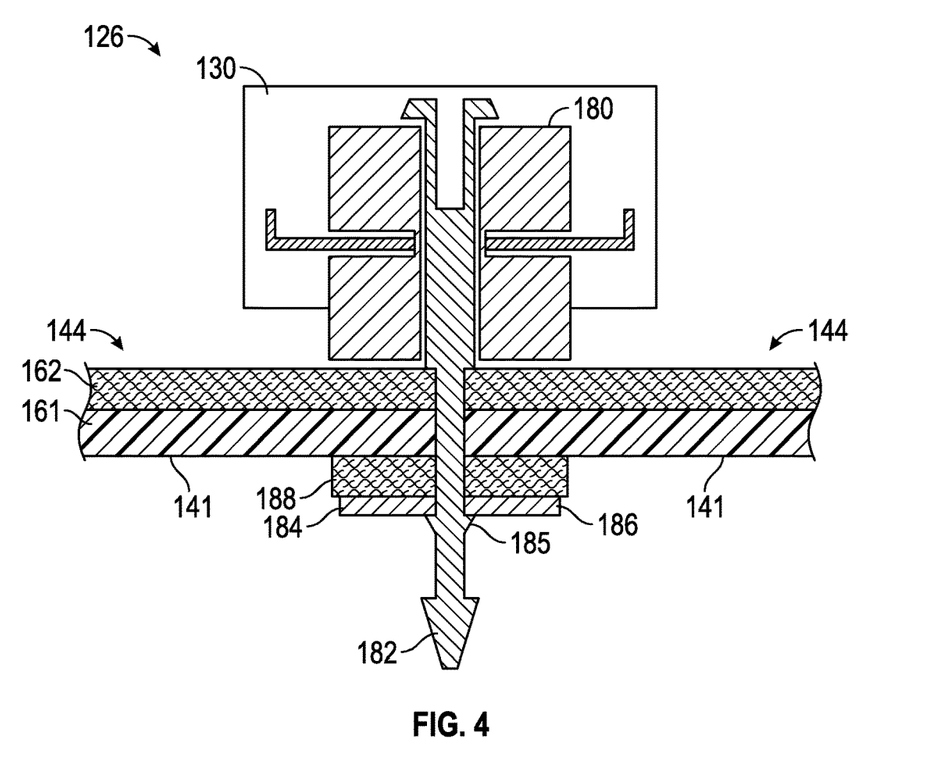
FIG. 4 is a cross-sectional view illustrating a retaining assembly of the over-frame blanket of FIG. 1.

Referring now to FIG. 4, a cross sectional view of an embodiment of a retaining assembly 126 is illustrated in accordance with the teachings of the present disclosure. Retaining assembly 126 is similar to the mounting assembly disclosed in US Patent Publication 20130175395, which is hereby incorporated by reference as to the structure disclosed therein, but not as to any term definitions used therein. In some embodiments, retaining assembly 126 incorporates a hard mounted spike fixed to fuselage frame 120.

Retaining assembly 126 includes a mounting block 180, a retaining spike 182, and a retaining cap 184. Mounting block 180 is secured to frame 120 and receives retaining spike 182. Retaining spike 182 and retaining cap 184 cooperate to secure over-frame blanket assembly 124 to fuselage frame 120. For example, retaining cap 184 may be restricted from separating from retaining spike 182 by a barbed projection 185.

Retaining cap 184 includes a rigid layer 186 and a vibration isolating layer 188. Rigid layer 186 resists deformation and cooperates with barbed projection 185 to limit separation of retaining cap 184 from retaining spike 182. Vibration isolating layer 188 is a damping material, such as felt or foam, which restricts vibration transmission between retaining cap 184 and sound barrier layer 161 of first blanket piece 144. Vibration isolating layer 188 directly abuts sound barrier layer 161 in the assembled state of retaining assembly 126 illustrated in FIG. 4 and fuselage assembly 100 illustrated in FIG. 1.

Figure 5:
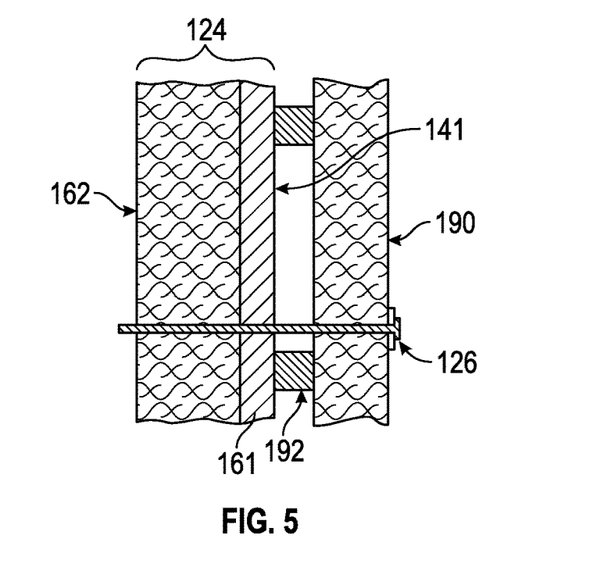
FIG. 5 is a cross-sectional view illustrating a releasable sound absorber secured to the over-frame blanket assembly of FIG. 1.

Referring now to FIG. 5, and with continued reference to FIG. 1, a cross-sectional view illustrates a releasable sound absorber 190 secured to over-frame blanket assembly 124. Releasable sound absorber 190, however, is a single layer secured in a releasable manner to over-frame blanket assembly 124. In the example provided, releasable sound absorber 190 is segmented and non-continuous to readily facilitate removal of releasable sound absorber 190 during repair of electronics and other equipment outboard of over-frame blanket assembly 124.

Releasable sound absorber 190 is secured to first outer surface 141 of sound barrier layer 161 by releasable fasteners 192. In the example provided, releasable fasteners 192 are hook and loop fasteners with one side (one of hook or loop) adhered to releasable sound absorber 190 and another side (the other of hook or loop) adhered to first outer surface 141. It should be appreciated that other releasable fasteners may be utilized without departing from the scope of the present invention. As used herein, releasable fastener refers means that the fastener is capable of fully separating sound absorber 190 from over-frame blanket assembly 124 without puncturing or otherwise damaging sound absorber 190 or over-frame blanket assembly 124.

In the example provided, retaining assembly 126 passes through and secures releasable sound absorber 190. It should be appreciated that the retaining cap need not have a vibration isolating layer when utilized to abut releasable sound absorber 190. In other embodiments, releasable sound absorber 190 is not secured by retaining assembly 126. In some embodiments, releasable sound absorber 190 is reduced in size to act as a moisture absorber for any condensation that may build up on first outer surface 141.

Figure 6:
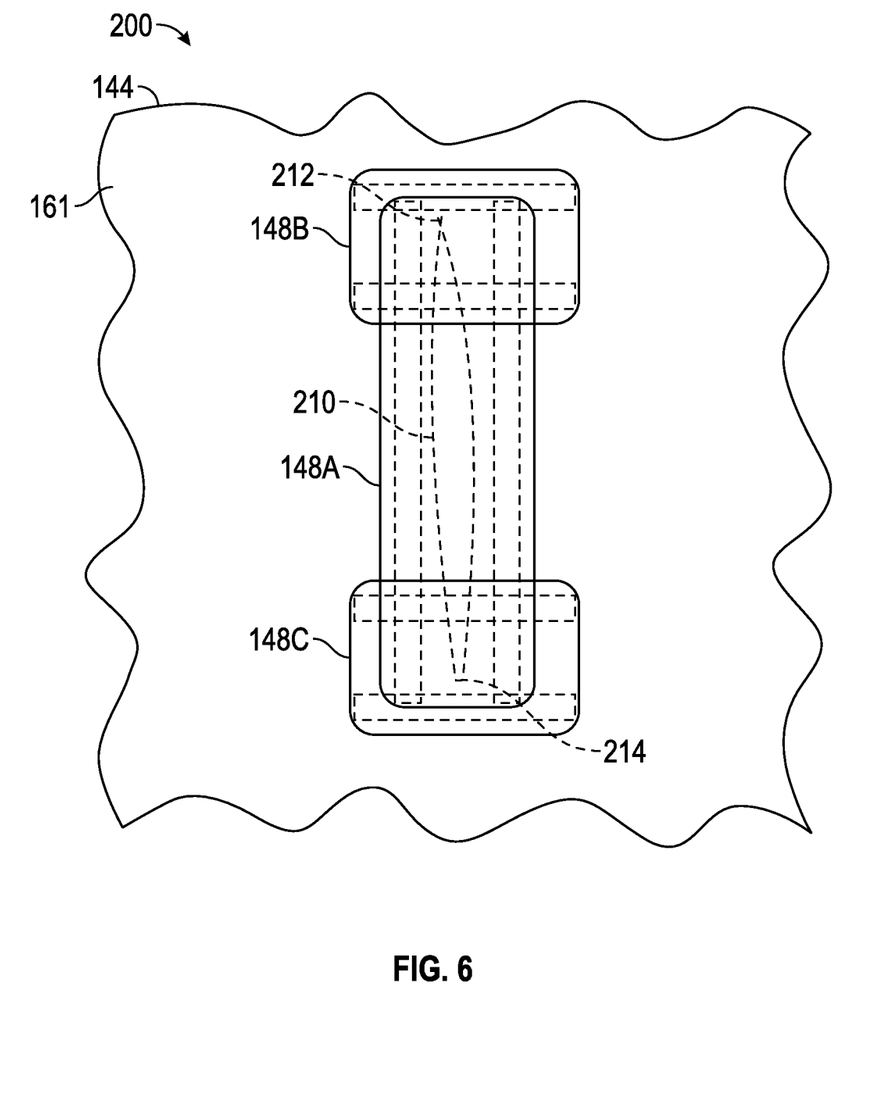
FIG. 6 is a front view of a non-limiting embodiment of a repaired portion of the over-frame blanket assembly of FIG. 1 in accordance with the teachings of the present disclosure.

Referring now to FIG. 6, a front view of an embodiment of a repaired portion 200 of first blanket piece 144 is illustrated in accordance with the teachings of the present disclosure. An aperture 210 in first blanket piece 144 extends longitudinally between a first end 212 and a second end 214. Aperture 210 may be a result of, for example, repair and maintenance of components—such as oxygen lines and electronics—disposed between over-frame blanket assembly 124 and fuselage skin 110. Aperture 210 is repaired by adherence of at least one acoustic barrier patch 148 directly to sound barrier layer 161 of first blanket piece 144.

In the example provided, first, second, and third acoustic barrier patches 148A, 148B, and 148C are applied in three locations to improve continuity of sound barrier material across the repaired portion 200. Acoustic barrier patches 148A-C are similar to acoustic barrier patch 148, but have been renumbered for clarity of describing orientations of the three separate patches. First acoustic barrier patch 148A is applied across the entire length of aperture 210 between first end 212 and second end 214. Second acoustic barrier patch 148B is applied perpendicular to first acoustic barrier patch 148A overtop first end 212 of aperture 210. Third acoustic barrier patch 148C is applied perpendicular to first barrier acoustic patch 148A overtop second end 214 of aperture 210. Accordingly, TBL compression waves traveling through aperture 210 are limited by an adhered acoustic barrier material in any direction along first outer surface 141 of over-frame blanket assembly 124. In some embodiments, second and third acoustic barrier patches 148B, 148C are omitted when adhesive layer 164 covers an entire surface of first acoustic barrier patch 148A.

Figure 7:
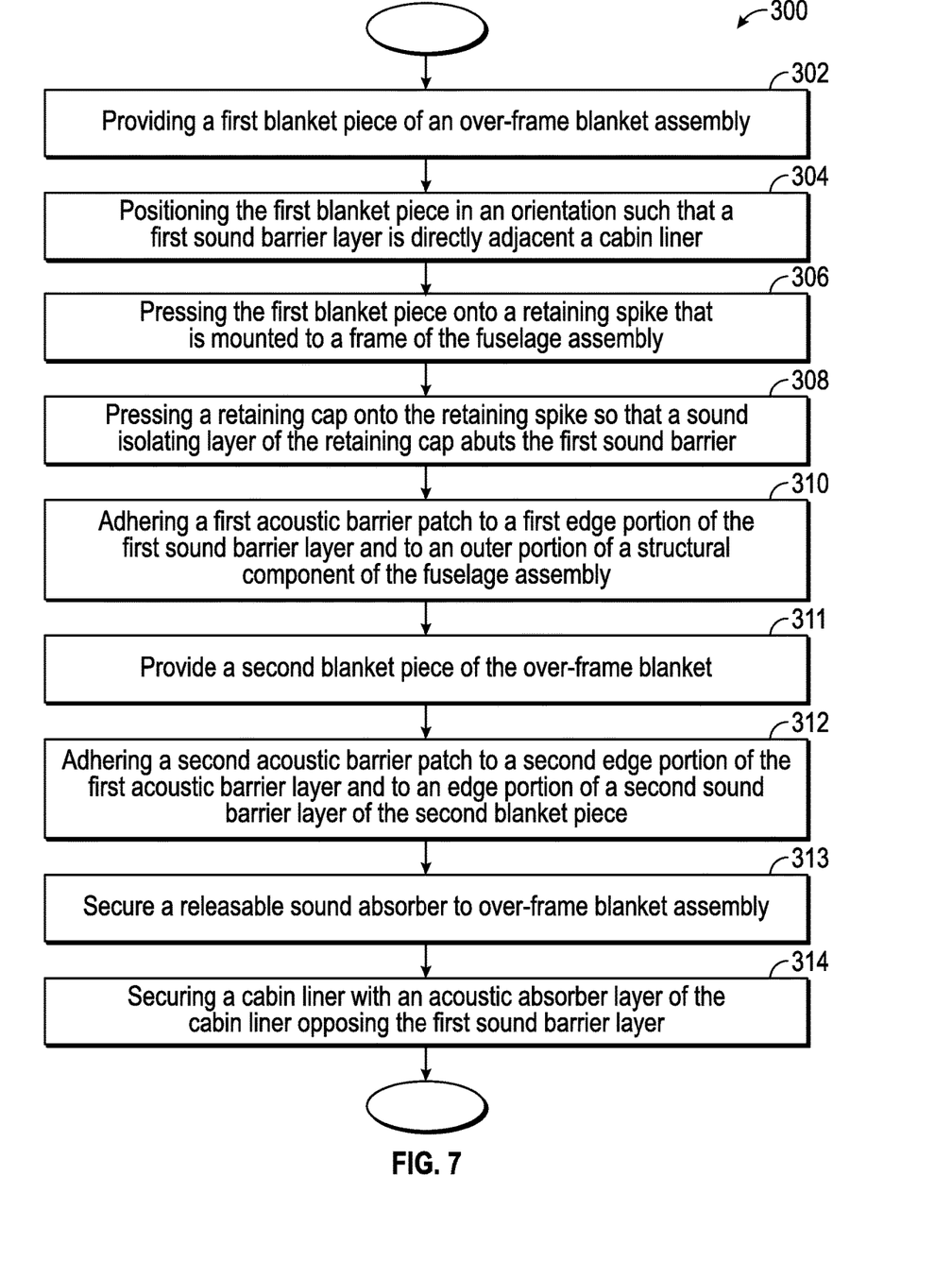
FIG. 7 is a block diagram illustrating a non-limiting embodiment of a method for installing an over-frame blanket in a fuselage assembly in accordance with the teachings of the present disclosure.

Referring now to FIG. 7, a flow diagram illustrates an embodiment of a method 300 for installing an over-frame blanket assembly in a fuselage assembly in accordance with the teachings of the present disclosure. For example, operations of method 300 may be performed by machines or technicians to install the over-frame blanket assembly.

Operation 302 provides a first blanket piece of an over-frame blanket assembly for the fuselage assembly. For example, operation 302 may provide first blanket piece 144 of over-frame blanket assembly 124. Operation 304 positions the first blanket piece in an orientation where a first outer surface of the over-frame blanket assembly that is defined by an acoustic barrier of the first blanket piece faces an inner cabin of the fuselage assembly. For example, first blanket piece 144 may be positioned with first outer surface 141 facing towards interior cabin cavity 112.

Operation 306 presses the first blanket piece onto a retaining spike that is mounted to a frame of the fuselage assembly. For example, operation 306 may press first blanket piece 144 onto retaining spike 182. Operation 308 presses a retaining cap onto the retaining spike so that a vibration isolating layer of the retaining cap abuts the sound barrier layer of the first blanket piece. For example, operation 308 may press retaining cap 184 onto retaining spike 182 so that vibration isolating layer 188 abuts first outer surface 141 of over-frame blanket assembly 124.

Operation 310 adheres a first acoustic barrier patch to a first edge portion of the sound barrier layer of the first blanket piece and to an outer portion of a structural component of the fuselage assembly. For example, acoustic barrier patch 148 may be adhered to first blanket piece 144 and to outer portion 174 of structural component 172 as illustrated in FIGS. 1 and 4.

Operation 311 provides a second blanket piece of the over-frame blanket assembly. Operation 312 adheres a second acoustic barrier patch to the second edge portion of the sound barrier layer of the first blanket piece. For example, operation 312 may adhere acoustic barrier patch 148 to first blanket piece 144 and second blanket piece 146 as illustrated in FIGS. 1-3. Operation 313 secures a releasable sound absorber to over-frame blanket assembly in a releasable manner. For example, operation 313 may secure releasable sound absorber 190 to over-frame blanket assembly 124 with releasable fasteners 192.

Operation 314 secures a cabin liner so that an acoustic absorber layer of the cabin liner opposes the acoustic barrier of the first blanket piece. It should be appreciated that additional operations, fewer operations, or alternative operations of method 300 may be performed in some embodiments. Furthermore, the order of operations may be different from the order in which the operations are described herein.

Figure 8:
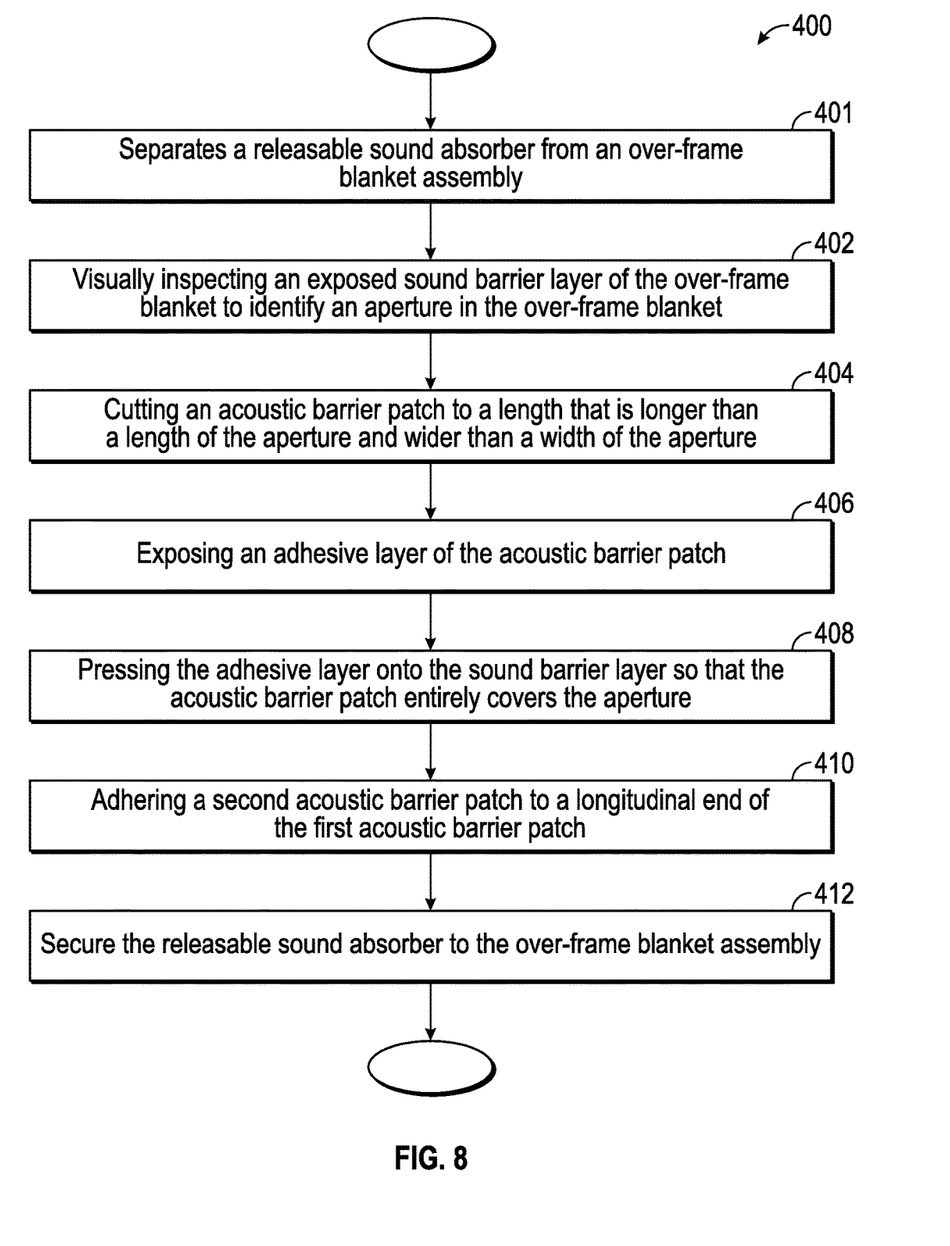
FIG. 8 is a block diagram illustrating a non-limiting embodiment of a method for repairing an over-frame blanket assembly is illustrated according to the teachings of the present disclosure.

Referring now to FIG. 8, a flow diagram of an embodiment of a method 400 of repairing an over-frame blanket assembly is illustrated according to the teachings of the present disclosure. For example, method 400 may be performed by machines or technicians to create repaired portion 200 as illustrated in FIG. 6.

Operation 401 separates a releasable sound absorber from an over-frame blanket assembly. For example, operation 401 may separate releasable absorber 190 using releasable fasteners 192.

Operation 402 visually inspects an exposed sound barrier layer of an over-frame blanket to identify an aperture in the over-frame blanket. For example, operation 402 may visually inspect first outer surface 141 of first blanket piece 144 to identify aperture 210. Operation 404 cuts an acoustic barrier patch to a length that is longer than a length of the aperture and wider than a width of the aperture. For example, first acoustic barrier patch 148A may be cut to be longer and wider than a length and a width of aperture 210.

Operation 406 exposes an adhesive layer of the acoustic barrier patch. For example, operation 406 may remove a release liner from adhesive layer 164 of acoustic barrier patch 148A. Operation 408 presses the adhesive layer onto the sound barrier layer so that the acoustic barrier patch entirely covers the aperture. For example, first acoustic barrier patch 148A may be pressed onto first outer surface 141 to cover aperture 210.

Operation 410 adheres a second acoustic barrier patch to a longitudinal end of the first acoustic barrier patch. For example, second acoustic barrier patch 148B may be adhered perpendicular to first acoustic barrier patch 148A at a first end 212 of aperture 210. Operation 412 secures the releasable sound absorber to the over-frame blanket assembly. For example, operation 412 may secure releasable sound absorber 190 to over-frame blanket assembly 124 using releasable fasteners 192 to cover acoustic barrier patches 148A-B.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fuselage assembly for an aircraft, the fuselage assembly comprising:
a fuselage structural member;
a fuselage skin associated with the fuselage structural member;
a cabin liner having an outer side facing the fuselage skin;
an over-frame blanket assembly disposed between the fuselage skin and the cabin liner and separated from the cabin liner, the over-frame blanket assembly comprising a first blanket piece, the first blanket piece comprising:
a first sound barrier layer that defines a first outer surface of the over-frame blanket assembly that is exposed radially inward of the over-frame blanket assembly and faces the cabin liner, and
a first sound absorbing layer that defines a second outer surface of the over-frame blanket assembly facing the fuselage skin; and
a retaining assembly comprising:
a retaining spike passing through an aperture in the first blanket piece; and
a retaining cap coupled with the fuselage structural member, secured to the retaining spike, and including a vibration isolating layer that abuts the first sound barrier layer.

2. The fuselage assembly of claim 1, wherein the over-frame blanket assembly further includes an acoustic barrier patch and a second blanket piece, the second blanket piece comprising a second sound barrier layer that further defines the first outer surface of the over-frame blanket assembly, wherein the acoustic barrier patch includes a sound barrier material adhered directly to the first sound barrier layer and directly to the second sound barrier layer.

3. The fuselage assembly of claim 2, wherein the acoustic barrier patch is adhered to the first sound barrier layer and the second sound barrier layer by an adhesive layer.

4. The fuselage assembly of claim 1, wherein the first sound barrier layer is a flexible mass barrier.

5. The fuselage assembly of claim 1, wherein the over-frame blanket assembly is a conformable over-frame blanket assembly.

6. A fuselage assembly for an aircraft, the fuselage assembly comprising:
a fuselage skin;
a structural component;
a cabin liner having an outer side facing the fuselage skin;
an over-frame blanket assembly disposed between the fuselage skin and the cabin liner and separated from the cabin liner, the over-frame blanket assembly comprising a first blanket piece, the first blanket piece comprising:

a first sound barrier layer that defines a first outer surface of the over-frame blanket assembly that is exposed radially inward of the over-frame blanket assembly and faces the cabin liner; and a first sound absorbing layer that defines a second outer surface of the over-frame blanket assembly facing the fuselage skin; and an acoustic barrier patch comprising a sound barrier that is adhered directly to the first sound barrier layer and is adhered directly to an outer portion of the structural component.

7. An over-frame blanket assembly for a fuselage assembly of an aircraft, the over-frame blanket assembly comprising:

a first sound barrier layer that defines a first outer surface of the over-frame blanket assembly, wherein the first sound barrier layer is exposed outward of the first outer surface; and a first sound absorbing layer that defines a second outer surface of the over-frame blanket assembly, wherein the first sound absorbing layer is exposed outward of the second outer surface for facing a fuselage skin when installed in the fuselage assembly, wherein the first sound barrier layer and the first sound absorbing layer define an entire depth of the over-frame blanket assembly.

8. The over-frame blanket assembly of claim 7, further comprising a first blanket piece and a second blanket piece, the first blanket piece consisting of the first sound barrier layer and the first sound absorbing layer, the second blanket piece consisting of a second sound barrier layer and a second sound absorbing layer, wherein the second sound barrier layer further defines the first outer surface of the over-frame blanket assembly.

9. The over-frame blanket assembly of claim 7, further comprising an acoustic barrier patch that includes a sound barrier material adhered directly to the first sound barrier layer and directly to the second sound barrier layer.

10. The over-frame blanket assembly of claim 7, wherein the acoustic barrier patch is adhered to the first sound barrier layer and the second sound barrier layer by an adhesive layer.

11. The over-frame blanket assembly of claim 7, wherein the first sound barrier layer is a flexible mass barrier.

12. The over-frame blanket assembly of claim 7, wherein the first sound absorbing layer is formed from a flame resistant felt material.

* * * * *